United States Patent [19]

Terui

[11] 4,447,768
[45] May 8, 1984

[54] MOTOR CONTROL DEVICE

[75] Inventor: Nobuhiko Terui, Tokyo, Japan
[73] Assignee: Nippon Kogaku K.K., Tokyo, Japan
[21] Appl. No.: 388,152
[22] Filed: Jun. 14, 1982

[30] Foreign Application Priority Data

Jun. 23, 1981 [JP] Japan .............................. 56-92682[U]

[51] Int. Cl.³ ........................... G03B 3/10; H02P 3/12
[52] U.S. Cl. ............................................. 318/293; 318/681;
354/409
[58] Field of Search ................... 354/25, 195; 318/293,
318/681

[56] References Cited

U.S. PATENT DOCUMENTS 3,523,228  8/1970  Currie et al. ...................... 318/681 X
3,560,829  2/1971  Brennan ........................... 318/681 X
4,184,753  1/1980  Hashimoto et al. .............. 354/195 X Primary Examiner—Michael L. Gellner
Attorney, Agent, or Firm—Fitzpatrick, Cella, Harper & Scinto

[57] ABSTRACT

A motor control device includes first and second pairs of transistors each connected to a power source, the first pair of transistors being adapted for connection to the terminals of the motor and capable of operating to connect the motor to the power source so that the motor is driven in a forward direction when the first pair of transistors conduct, the second pair of transistors being adapted for connection to the terminals of the motor and capable of operating to reversibly connect the motor to the power source so that the motor is driven in a reverse direction when the second pair of transistors conduct, first and second input terminals capable of receiving as input a signal for controlling the motor, a first element connected to the first input terminal and responsive to said signal to cause the first pair of transistors to conduct, the first element including a device responsive to said signal to prevent conduction of the second pair of transistors, a second element connected to the second input terminal and responsive to said signal to cause the second pair of transistors to conduct, the second element including a device responsive to said signal to prevent conduction of the second pair of transistors, and apparatus for supplying said signal to at least one of the first and second input terminals.

2 Claims, 1 Drawing Figure

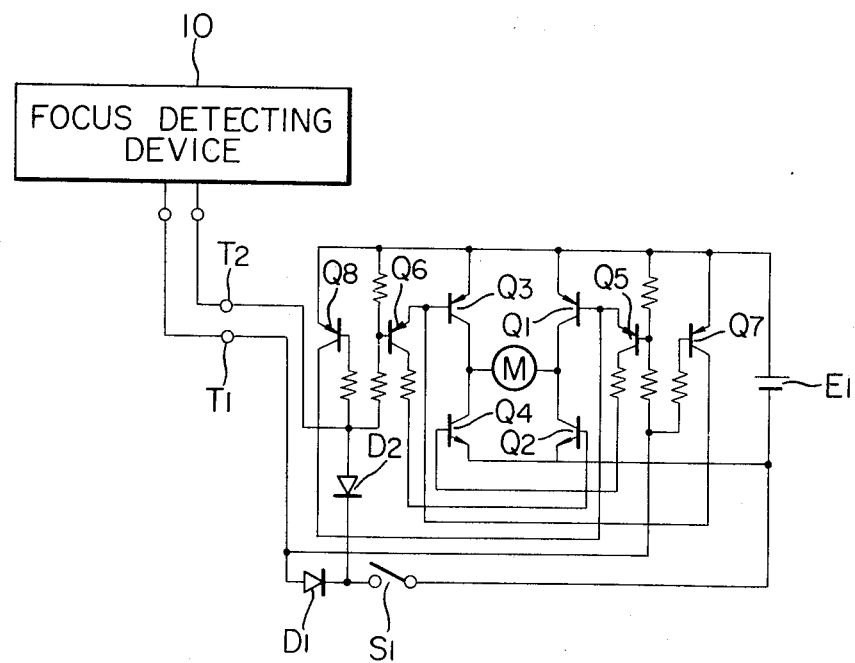

MOTOR CONTROL DEVICE

BACKGROUND OF THE INVENTION

1. Field of the Invention

This invention relates to a motor control device, and more particularly to a motor control device suitable for driving the picture-taking lens moving motor of the automatic focusing apparatus of a camera.

2. Description of the Prior Art

As a focus detecting device for detecting the condition of focusing of the picture-taking lens of a camera with respect to an object to be photographed, a device which produces three different signals to control the driving device of a motor for driving the focusing optical system of the picture-taking lens, namely, a front focus signal for moving the optical system in one direction during the front focus condition in which the picture-taking lens is focused to the front side of a major object to be photographed, a rear focus signal for moving the optical system in the other direction during the rear focus condition in which the picture-taking lens is focused to the rear side of the major object, and an in-focus signal for stopping the movement of the optical system when the picture-taking lens has become in-focus to the major object has already been proposed in U.S. application Ser. No. 167,912 filed on July 11, 1980 by the applicant and corresponding German Laid-open Patent (DOS) No. 30 27 729. The above-described driving device for causing the rotation of the motor to respond to such three different signals is usually provided with three input terminals to operate switching elements for forming the forward rotation circuit, the reverse rotation circuit and the circuit for suddenly stopping the motor, respectively. Particularly, in a camera wherein the camera body and the picture-taking lens sturcture are separable from each other, when it is taken into account that a signal is transmitted from the focus detecting device provided in the camera body to the driving device provided in the lens structure, at least three electrical contacts are required between the camera body and the lens structure to transmit respective signals to three input terminals. An increase in the number of such electrical contacts is inconvenient for the designing of modern cameras in which transmission of numerous types of information must be made possible between the camera body and the lens.

SUMMARY OF THE INVENTION

It is an object of the present invention to provide an improved motor control device which is capable of controlling forward rotation, reverse rotation and sudden stopping of a motor.

The motor control device according to the present invention is provided with two input terminals for said control. The device of the present invention is further provided with a transistor bridge circuit comprising first and second transistors connected in series with each other and third and fourth transistors also connected in series with each other, a motor connected between the junction between the first transistor and the second transistor and the junction between the third transistor and the fourth transistor, a fifth transistor which, when conductive, turns on both the first transistor and the fourth transistor opposed to each other diagonally of the bridge circuit, a sixth transistor which, when conductive, turns on both the second transistor and the third transistor opposed to each other diagonally of the bridge circuit, a seventh transistor which, when conductive, forcibly turns off the third transistor in spite of the turn-on of the sixth transistor, and an eighth transistor which, when conductive, forcibly turns off the first transistor in spite of the turn-on of the fifth transistor, and one of the two input terminals is connected to the fifth transistor and the seventh transistor while the other input terminal is connected to the sixth transistor and the eighth transistor. The motor control device of the present invention is best suited for a device for driving the picture-taking lens of the automatic focusing apparatus of a camera.

The invention will become more fully apparent from the following detailed description thereof taken in conjunction with the accompanying drawing.

BRIEF DESCRIPTION OF THE DRAWING

The FIGURE of the drawing is a circuit diagram of the motor control device according to an embodiment of the present invention.

DESCRIPTION OF THE PREFERRED EMBODIMENT

Referring to the drawing, four transistors $Q_1$, $Q_2$, $Q_3$ and $Q_4$ together constitute a transistor bridge circuit connected in the form of a bridge, and a motor M is connected between the junction between the transistors $Q_1$ and $Q_2$ connected in series with each other and the junction between the transistors $Q_3$ and $Q_4$ also connected in series with each other. A transistor $Q_5$, when turned on, turns on both of the transistors $Q_1$ and $Q_4$ opposed to each other diagonally of the above-described transistor bridge circuit. A transistor $Q_6$, when turned on, turns on both of the remaining transistors $Q_2$ and $Q_3$ opposed to each other diagonally of the above-described transistor bridge circuit. The collector of a transistor $Q_7$ is connected to the junction between the base of the transistor $Q_3$ and the emitter of the transistor $Q_6$, and the transistor $Q_7$, when turned on, forcibly turns off the transistor $Q_3$ and supplies an emitter current to the transistor $Q_6$. The collector of a transistor $Q_8$ is connected to the junction between the base of the transistor $Q_1$ and the emitter of the transistor $Q_5$, and the transistor $Q_8$, when turned on, forcibly turns off the transistor $Q_1$ and supplies an emitter current to the transistor $Q_5$. A terminal $T_1$ is connected to the bases of the transistors $Q_5$ and $Q_7$, and a terminal $T_2$ is connected to the bases of the transistors $Q_6$ and $Q_8$. A manually operated switch $S_1$ is normally open, and one end thereof is connected to the negative pole of a power source $E_1$ and the other end thereof is connected to the terminal $T_1$ through a diode $D_1$ and to the terminal $T_2$ through a diode $D_2$.

When an L-level potential and an H-level potential are applied to the terminals $T_1$ and $T_2$, respectively, the L-level potential turns on the transistors $Q_5$ and $Q_7$ and both of the opposed transistors $Q_1$ and $Q_4$ of the bridge circuit are turned on. On the other hand, the H-level potential of the terminal $T_2$ turns off the transistors $Q_6$ and $Q_8$ and the turn-off of this transistor $Q_6$ turns off both of the other opposed transistors $Q_2$ and $Q_3$. Accordingly, a current flows from the power source $E_1$ through the transistor $Q_1$, the motor M and the transistor $Q_4$, so that the motor M rotates in a forward direction. When an H-level potential and an L-level potential are applied to the terminals $T_1$ and $T_2$, respectively, the L-level potential turns on both of the transistors $Q_6$ and $Q_8$ and both of the opposed transistors $Q_2$ and $Q_3$ of the bridge circuit are turned on. On the other hand, the H-level potential of the terminal $T_1$ turns off the transistors $Q_5$ and $Q_7$ and the turn-off of this transistor $Q_5$ turns off both of the other opposed transistors $Q_1$ and $Q_4$. Accordingly, a current flows from the power source $E_1$ through the transistor $Q_3$, the motor M and the transistor $Q_2$, so that the motor M rotates in a reverse direction.

When an L-level potential is applied to both of the terminals $T_1$ and $T_2$, as previously described, the L-level potential of the terminal $T_1$ turns on the transistors $Q_5$ and $Q_7$ and the L-level potential of the terminal $T_2$ turns on the transistors $Q_6$ and $Q_8$. The turn-on of this transistor $Q_7$ forcibly turns off the transistor $Q_3$ and supplies the emitter current thereof to the transistor $Q_6$. By the turn-on of this transistor $Q_6$, the transistor $Q_2$ is turned on. On the other hand, the turn-on of the transistor $Q_8$ forcibly turns off the transistor $Q_1$ and supplies the emitter current thereof to the transistor $Q_5$. The turn-on of this transistor $Q_5$ turns on the transistor $Q_4$. In this manner, the transistors $Q_2$ and $Q_4$ of the transistor bridge circuit are turned on to constitute a short-circuiting circuit for the motor M. Therefore, the motor M in rotation suddenly stops rotating. When the driving of the motor is not required, an H-level potential is applied to both of the input terminals $T_1$ and $T_2$. By this, all of the transistors $Q_1$–$Q_8$ are turned off and power is not supplied to the motor M, which thus remains stopped. When the manually operated switch $S_1$ is closed, the terminals $T_1$ and $T_2$ are forcibly rendered into an L-level potential through the diodes $D_1$ and $D_2$, respectively. Therefore, the motor M suddenly stops rotating just in the same way as previously described.

Such a motor control device is best suited for the picture-taking lens driving device of the automatic focusing apparatus of a camera. That is, the output terminal of a focus detecting device 10 is connected to the input terminals $T_1$ and $T_2$ of the motor control device. This focus detecting device 10 applies an L-level signal and an H-level signal to the terminals $T_1$ and $T_2$, respectively, during detection of front focus, applies an H-level signal and an L-level signal to the terminals $T_1$ and $T_2$, respectively, during detection of rear focus, and applies an L-level signal to both of the terminals $T_1$ and $T_2$ during detection of in-focus. Thus, during front focus and during rear focus, the motor M rotates in a forward direction and in a reverse direction, respectively, thereby moving the picture-taking lens in one direction or in a reverse direction and during in-focus, the motor is suddenly stopped to stop the picture-taking lens at the in-focus position. In order that the picture-taking lens may be stopped independently of the focus detecting device 10, the manually operated switch $S_1$ may be closed.

The relation between the input signal level and the motor drive can be determined conversely. That is, an H-level signal and an L-level signal may be applied to the terminals $T_1$ and $T_2$, respectively, to thereby rotate the motor in a forward direction. Also, the polarities of the transistors may be arbitrarily determined.

I claim:
1. A motor control device comprising:
(a) a transistor bridge circuit comprising first and second transistors connected in series with each other and third and fourth transistors connected in series with each other;
(b) a motor connected between the junction between said first transistor and said second transistor and the junction between said third transistor and said fourth transistor;
(c) means for producing first and second output signals, said means having first and second terminals from which said first and second output signals are transmitted, respectively;
(d) a first switching element connected to said first terminal and responsive to said first output signal to cause said first transistor and said fourth transistor opposed to each other diagonally in said bridge circuit to conduct;
(e) a second switching element connected to said second terminal and responsive to said second output signal to cause said second transistor and said third transistor opposed to each other diagonally in said bridge circuit to conduct;
(f) a third switching element connected to said first terminal and responsive to said first output signal to cause said third transistor to turn off forcibly; and
(g) a fourth switching element connected to said second terminal and responsive to said second output signal to cause said first transistor to turn off forcibly.

2. A motor control device comprising:
(a) a transistor bridge circuit comprising first and second transistors connected in series with each other and third and fourth transistors connected in series with each other;
(b) a motor connected between the junction between said first transistor and said second transistor and the junction between said third transistor and said fourth transistor;
(c) a fifth transistor which, when conductive, turns on both of said first transistor and said fourth transistor opposed to each other diagonally of said bridge circuit;
(d) a sixth transistor which, when conductive, turns on both of said second transistor and said third transistor opposed to each other diagonally of said bridge circuit;
(e) a seventh transistor which, when conductive, forcibly turns off said third transistor in spite of the turn-on of said sixth transistor;
(f) an eighth transistor which, when conductive, forcibly turns off said first transistor in spite of the turn-on of said fifth transistor;
(g) a first input terminal for turning on said fifth transistor and said seventh transistor upon application of an input signal thereto; and
(h) a second input terminal for turning on said sixth transistor and said eighth transistor upon application of an input signal thereto.

* * * * *